United States Patent
Ling et al.

(10) Patent No.: US 10,773,959 B2
(45) Date of Patent: Sep. 15, 2020

(54) HIGH-THROUGHPUT METHOD TO PREDICT BULK PROPERTIES OF INORGANIC MATERIALS

(71) Applicant: Toyota Motor Engineering & Manufacturing North America, Inc., Erlanger, KY (US)

(72) Inventors: Chen Ling, Ann Arbor, MI (US); Ying Zhang, Ann Arbor, MI (US); Zhiqian Chen, Falls Church, VA (US); Debasish Banerjee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 644 days.

(21) Appl. No.: 15/597,651

(22) Filed: May 17, 2017

(65) Prior Publication Data

US 2018/0336288 A1 Nov. 22, 2018

(51) Int. Cl.
*C01B 25/14* (2006.01)
*C01B 11/06* (2006.01)
*C01G 28/00* (2006.01)

(52) U.S. Cl.
CPC .......... *C01B 25/14* (2013.01); *C01B 11/062* (2013.01); *C01G 28/002* (2013.01); *C01P 2002/72* (2013.01); *C01P 2002/77* (2013.01)

(58) Field of Classification Search
CPC ..... C01B 25/14; C01B 11/062; C01G 28/002; C01P 2002/72; C01P 2002/77
See application file for complete search history.

(56) References Cited

U.S. PATENT DOCUMENTS

2012/0130694 A1* 5/2012 Srivastava ............. G06F 19/00
703/6

OTHER PUBLICATIONS

Wang, Y. et al., "Design Principles for solid-state lithium superionic conductors", Nature Materials, vol. 14, pp. 1026-1032 (Oct. 2015).
Ong, S.P. et al., "Python Materials Genomics (pymatgen):A robust, open-source python library for materials analysis," Computational Materials Science, 68, pp. 314-319 (2013).
Bachman, J.P. et al., "Inorganic Sold-State Electrolytes for Lithium Batteries: Mechanisms and Properties Governing Ion Conduction," Chem. Rev., 116, pp. 140-162 (2016).

(Continued)

*Primary Examiner* — Saif A Alhija
(74) *Attorney, Agent, or Firm* — Christopher G. Darrow; Darrow Mustafa PC

(57) ABSTRACT

Methods for representing crystal structure of inorganic materials in matrix form, and for quantitative comparison of multiple inorganic materials, can be employed to identify candidate materials with high potential to possess a desired property. Such methods can include conversion of an atomic coordinate set to a coordinate set for an anion only lattice, anion substitution, and unit cell re-scaling. Such methods can further include simulation of x-ray diffraction data for modified anion-only lattices, and generation of n×2 matrices from the simulated diffraction data. Quantitative structural similarity values can be derived from the n×2 matrices. The quantitative structural similarity values can be useful for structural categorization, as well as prediction of functional properties.

7 Claims, 6 Drawing Sheets

(56) References Cited

OTHER PUBLICATIONS

Wang, Y. et al., "Design Principles for solid-state lithium superionic conductors", Nature Materials, vol. 14, pp. 1026-1032 (Oct. 2015) (Supplementary information; available at http://www.nature.com/nmat/journal/v14/n10/extref/nmat4369-s1.pdf).

* cited by examiner

US 10,773,959 B2

HIGH-THROUGHPUT METHOD TO PREDICT BULK PROPERTIES OF INORGANIC MATERIALS

TECHNICAL FIELD

The present disclosure generally relates to systems for the quantitative analysis of molecular structure and, more particularly, to systems for the quantitative analysis of inorganic crystal structure.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

In materials informatics, a key step that bridges the raw data and machine learning is the data representation, which transforms the raw data into fingerprints/features that computer can analyze. While several methods have been proposed to represent crystal structures of inorganic materials, they fail to compare the similarity between two distinct structures.

In previous studies, structure matching algorithms were employed to match the structure of two compounds through a continuous transformation, yielding a degree of distortion required to match two structures. This method does not provide quantitative information on structural similarity.

Accordingly, it would be desirable to provide an improved method for the quantitative analysis of inorganic crystal structures.

SUMMARY

This section provides a general summary of the disclosure, and is not a comprehensive disclosure of its full scope or all of its features.

In various aspects, the present teachings provide a method for selecting an inorganic material having a desired property. The method includes a step of selecting: (i) a standard inorganic material known to have the desired property; and (ii) one or more candidate inorganic materials potentially having the desired property. The method further includes obtaining a set of atomic coordinates for the standard inorganic material and each of the one or more candidate inorganic materials, the set of atomic coordinates including a cation lattice that has a cation identity and set of cation coordinates; and an anion lattice that has an anion identity and set of anion coordinates. The method further includes removing the cation lattice from each set of atomic coordinates, to produce an anion-only lattice, each anion-only lattice defining an anionic unit cell, each anionic unit cell having a volume per anion. The method further includes replacing the anion identity in at least one of the anion-only lattices with an identity of a designated monoatomic anion, to ensure that all of the anion-only lattices have the same anion identity. The method further includes re-scaling at least one anionic unit cell to a selected volume, to ensure that all anionic unit cells have the same volume per anion. The method further includes generating a matrix for each anion-only lattice, each matrix comprising a series of diffraction angles, $\{x_i\}$, and a series of corresponding, simulated diffraction intensities, $\{y_i\}$, each series having indices, i, where $x_i$ is the same for all n×2 matrices at each index. The method further includes generating, for each of the candidate inorganic materials, a numerical value, S, defining structural similarity between the standard inorganic material and the respective candidate inorganic material, by performing a calculation:

$$S=E[(Y-\mu_Y)(Y'-\mu_{Y'})]/\sigma_Y\sigma_{Y'}$$

wherein S, ranging from zero to one, is the numerical value defining structural similarity; Y is a vector defining the series $\{y_i\}$ for the matrix corresponding to the standard inorganic material; Y' is a vector defining the series $\{y_i'\}$ for the matrix corresponding to the respective candidate inorganic material, $\mu_Y$ is the mean of Y; $\mu_{Y'}$ is the mean of Y'; $\sigma_Y$ is the standard deviation of Y; $\mu_{Y'}$ is the standard deviation of Y'; and E is an operation to obtain the expectation value over all indices. The method further includes selecting the candidate inorganic material having a desired value of S.

In other aspects, the present teachings provide a method for performing a quantitative comparison of inorganic crystal structures. The method includes a step of selecting at least two inorganic materials to be compared. The method further includes obtaining a set of atomic coordinates for each of the at least two inorganic materials, the set of atomic coordinates including a cation lattice that has a cation identity and set of cation coordinates; and an anion lattice that has an anion identity and set of anion coordinates. The method further includes removing the cation lattice from each set of atomic coordinates, to produce an anion-only lattice, each anion-only lattice defining an anionic unit cell, each anionic unit cell having a volume per anion. The method further includes replacing the anion identity in at least one of the anion-only lattices with an identity of a designated monoatomic anion, to ensure that all of the anion-only lattices have the same anion identity. The method further includes re-scaling at least one anionic unit cell to a selected volume, to ensure that all anionic unit cells have the same volume per anion. The method further includes generating a matrix for each anion-only lattice, each matrix comprising a series of diffraction angles, $\{x_i\}$, and a series of corresponding, simulated diffraction intensities, $\{y_i\}$, each series having indices, i, where $x_i$ is the same for all n×2 matrices at each index. The method further includes generating, for each of the candidate inorganic materials, a numerical value, S, defining structural similarity between the standard inorganic material and the respective candidate inorganic material, by performing a calculation:

$$S=E[(Y-\mu_Y)(Y'-\mu_{Y'})]/\sigma_Y\sigma_{Y'}$$

wherein S, ranging from zero to one, is the numerical value defining structural similarity; Y is a vector defining the series $\{y_i\}$ for the matrix corresponding to the standard inorganic material; Y' is a vector defining the series $\{y_i'\}$ for the matrix corresponding to the respective candidate inorganic material, $\mu_Y$ is the mean of Y; $\mu_{Y'}$ is the mean of Y'; $\sigma_Y$ is the standard deviation of Y; $\sigma_{Y'}$ is the standard deviation of Y'; and E is an operation to obtain the expectation value over all indices.

In still other aspects, the present teachings provide a method for representing a crystal structure of an inorganic material in an n×2 matrix. The method includes a step of obtaining a set of atomic coordinates for the inorganic material, the set of atomic coordinates including a cation lattice and an anion lattice. The cation lattice includes a cation identity and set of cation coordinates; and the anion lattice includes an anion identity and set of anion coordinates. The method further includes a step of removing the cation lattice from the set of atomic coordinates, to produce an anion-only lattice, the anion-only lattice defining an anionic unit cell, the anionic unit cell having a per-anion volume. The method further includes a step of generating a simulated x-ray diffraction pattern for the anion-only lattice. The method further includes a step of generating, using the simulated x-ray diffraction pattern, a matrix for the anion-only lattice, the matrix comprising a series of diffraction angles, $\{x_i\}$, and a series of corresponding, simulated diffraction intensities, $\{y_i\}$.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide methods for predicting the properties of inorganic materials and selecting materials having a desired property. The methods can be useful, for example, in selecting new candidate materials for applications requiring particular ionic, electronic, or thermal conductivity or insulation, or any other property reasonably predictable on the basis of structural similarity. The system of the present disclosure is more advanced based on these facts: (i) it gives a representation of crystal structure into one n×2 matrix, and the representation can be directly used in materials informatics; (ii) it gives quantitative similarity between different structures; and (iii) it avoids the mislabeling when two structures can be matched through large distortions.

The methods of the present disclosure include multiple transformations of crystal structure data for a reference inorganic materials known to have a desired property. The multiple transformations produce a modified atomic coordinate set, from which a matrix having a series of simulated x-ray diffraction intensities is produced. Equivalent steps are applied to one or more candidate inorganic materials, producing one or more matrices, each having a series of simulated x-ray diffraction intensities. A similarity value is derived for each candidate an organic material, on the basis of a comparison of a vector representing its intensity matrix to a vector representing the reference inorganic material's intensity matrix. Candidates having high similarity values are then selected on that basis.

The present teachings describe a method to generate a quantitative digital value from structural data derived from inorganic compounds, and to use the generated quantitative values to generate quantitative similarity scores for different inorganic compounds. The present teachings further provide methods to use the generated, quantitative similarity scores to predict the properties of inorganic materials, and to select candidate materials based on probability of possessing a desired property.

Figure 1:
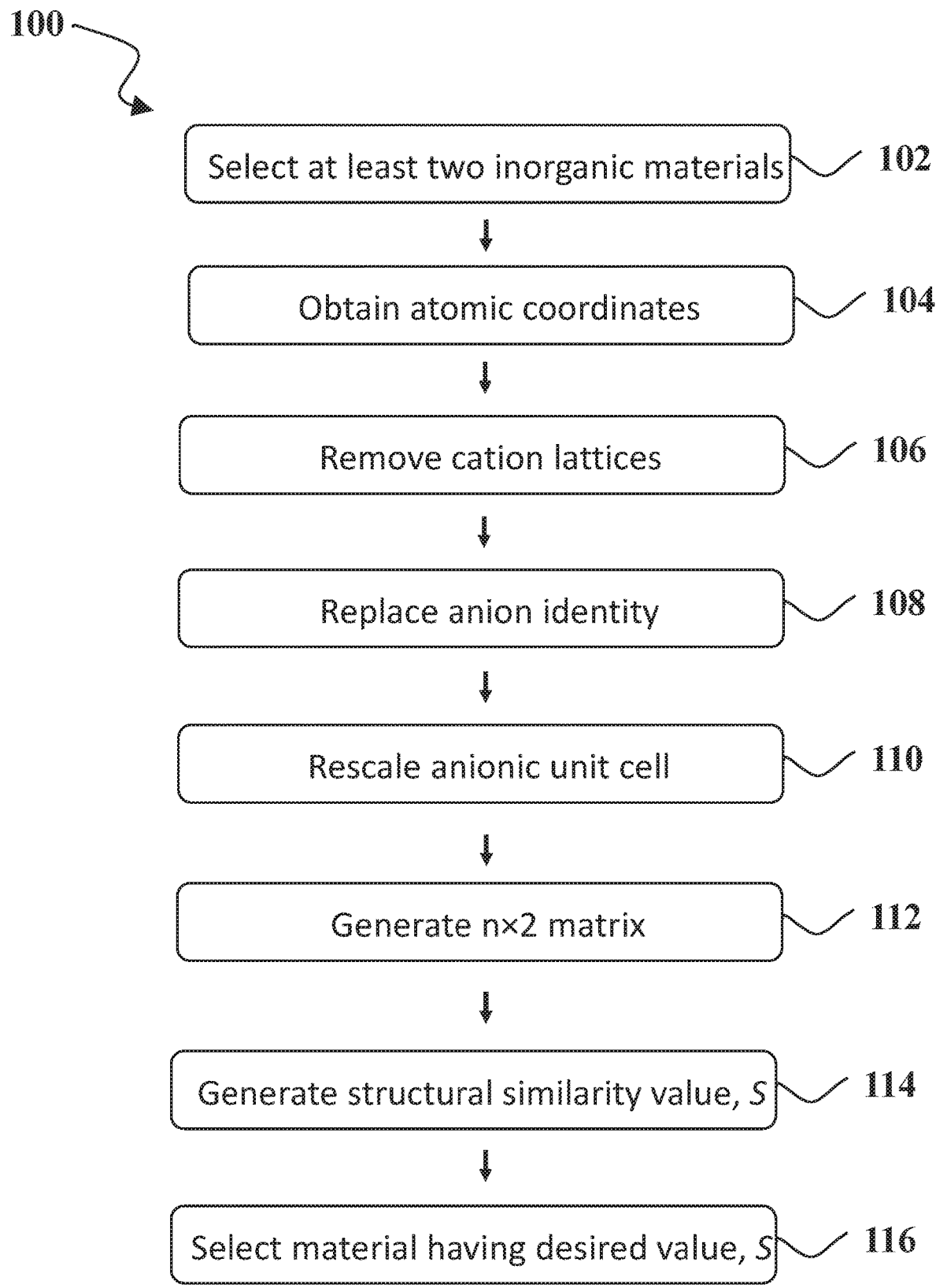
FIG. 1 is a flow chart of an exemplary method for a quantitative comparison of inorganic materials.

With reference to FIG. 1, the present teachings thus disclose a method 100 for quantitatively comparing the structures of inorganic materials. The method includes a first step 102 of selecting at least two inorganic materials to be compared. Inorganic compounds suitable for the present method 100 will generally be any compound having at least one inorganic cation—each of which can be a simple or compound cation; and at least one inorganic anion—each of which can be a simple or compound anion. In specific implementations, the method 100 can be adapted for the purpose of selecting an inorganic material having a desired property. In such implementations, step 102 can include a first sub-step of selecting a standard inorganic material known to have a desired property; and a second sub-step of selecting one or more candidate inorganic materials potentially having the desired property. For example, if a given inorganic material, such as a perovskite type lithium lanthanum titanate, is known to be a good lithium ion conductor, a group of candidate inorganic materials of unknown lithium ion conducting capability can be rapidly and quantitatively screened for structural similarity to the known material, and thus for potential lithium ion conducting capability.

The method 100 can include a step 104 of obtaining a set of atomic coordinates for the standard inorganic material and for each of the one or more candidate inorganic materials. A set of atomic coordinates will generally include a cation lattice containing a cation identity and a set of cation coordinates for each of the at least one inorganic cations of the given inorganic material. The set of atomic coordinates will generally also include an anion lattice containing an anion identity and set of anion coordinates for the inorganic anion of the given inorganic material. For example, a set of atomic coordinates for a given lithium lanthanum titanate will contain the coordinates of lithium and lanthanum cations, and the positions of titanate anions.

The method 100 can include a step 106 of removing the cation lattice from each set of atomic coordinates, to produce and anion-only lattice, each anion-only lattice defining and an ionic unit cell, each anionic unit cell having a volume per anion. For example, in the case of a lithium lanthanum titanate atomic coordinate set, lithium and lanthanum cation coordinates would be removed, leaving only coordinates of titanate anions. The remaining coordinate set of titanate anions would then represent the anion-only lattice.

The method 100 can also include a step 108 of replacing the anion identity in at least one of the anion-only lattices with an identity of a designated monoatomic anion, to ensure that all of the anion-only lattices have the same anion identity. For example, when comparing two inorganic compounds, one of which has coordinates of titanate anions, and the other of which has coordinates of phosphate anions, both could be replaced with sulfide anions, in the respective structure data files. It will be understood that the step 108 can be useful to remove comparative differences resulting, for example, from anion volume, so that the comparison of the method 100 will be focused primarily on crystal geometry. It is further to be understood that step 108 can be performed before or after the step 106.

The method 100 can further include a step 110 of re-scaling at least one anionic unit cell to a selected volume, to ensure that all anionic unit cells have the same volume per anion. For example, re-scaling can be done by isotropic expansion slash swelling of the lattice according to an equation:

$$a'/a_0 = b'/b_0 = c'/c_0 = (N \times V_0/V)^{1/3} \quad \text{Eq. 1}$$

where $a_0$, $b_0$, $c_0$ are the lattice parameters before re-scaling; $a'$, $b'$, and $c'$ are the lattice parameters after rescaling; N is the number of anions in the unit cell; V is the volume of the unit cell before rescaling; and $V_0$ is the normalized volume of the unit cell after rescaling. In certain examples employed herein, $V_0$ is 16 Å$^3$. It will be understood that the step of re-scaling at least one anionic unit cell to a selected volume (step 110) can have the effect of eliminating comparative differences that would result from different anion volumes, so that the method 100 primarily assesses structural similarity on the basis of angular position of anions within the individual anion-only lattices relative to one another. Such re-scaling produces a modified anion-only lattice, from each anion-only lattice so scaled. Once any number of anion-only lattices have been re-scaled such that all anion-only lattices to be compared have the same volume per anion, all of the anion-only lattices to be compared can be termed modified anion-only lattices.

The method 100 can include a step 112 of generating a matrix for each modified anion-only lattice, each matrix comprising a series of diffraction angles, $\{x_i\}$, and a series of corresponding, simulated diffraction intensities, $\{y_i\}$, each series having indices, i, where $x_i$ is the same for all matrices at each index. In some examples, generating a matrix for each anion-only lattice can include a step 113 of calculating a simulated X-ray diffraction pattern for the modified anion-only lattice.

Figure 2:
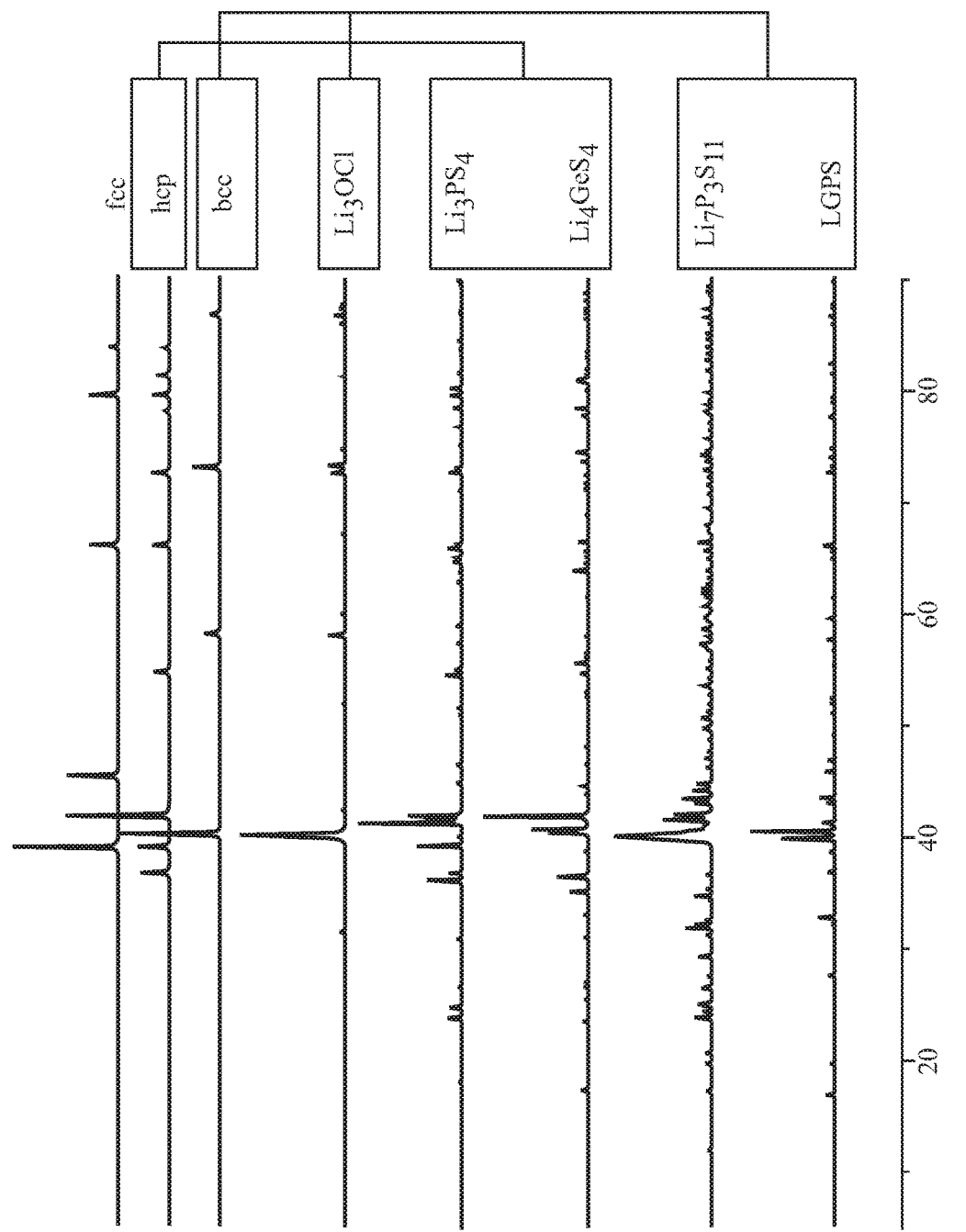
FIG. 2 is a series of simulated x-ray diffraction spectra of several inorganic materials, according to the methods of the present disclosure.

FIG. 2 shows simulated X-ray diffraction patterns for five modified anion-only lattices, derived from Li$_3$OCl, γ-Li$_3$PS, Li$_4$GeS$_4$, Li$_7$P$_3$S$_{11}$, and Li$_{10}$GeP$_2$Si$_2$ (LGPS). In each case, as described above, the cation coordinates were removed, the anions were replaced with a common anion (in this case, sulfide), and the unit cells were re-scaled to a common volume (in this case, 16 Å$^3$). FIG. 2 can include simulated spectra for three prototype metallic crystalline structures: face-centered cubic (fcc) body-centered cubic (bcc), and hexagonal close packing (hcp). Visual examination of the simulated spectra of FIG. 2 immediately suggests that Li$_3$OCl, Li$_7$P$_3$S$_{11}$, and LGPS are more similar to a bcc structure, whereas γ-Li$_3$PS and Li$_4$GeS$_4$ more closely resemble an hcp structure, as has been previously observed. This can be understood to show that the transformations described above maintain the basic structural relationships of the original atomic coordinate sets within the modified anion-only lattices, and that the modified anion-only lattices are suitable bases for the quantitative analysis to follow.

It will be understood that the matrices comprising a series of diffraction angles, $\{x_i\}$, and a series of corresponding, simulated diffraction intensities, $\{y_i\}$ can be generated directly from the simulated X-ray diffraction spectra, as said spectra consist of diffraction intensity as a function of diffraction angle. It will further be understood, however, that while it may be desirable in many instances to produce simulated X-ray diffraction spectra, it can be possible to generate the matrices of diffraction angle and intensity without actually producing, or plotting, the simulated spectra.

The method 100 can include a step 114 of generating, for each of the candidate inorganic materials, a numerical value, S, defining structural similarity between the standard inorganic material and the respective candidate inorganic material. For concision, the numerical value, S, will be referred to as the structural similarity value. In an example, the numerical value, S, or will can be generated by applying the following relationship to the matrix:

$$S = E[(Y - \mu_Y)(Y' - \mu_{Y'})]/\sigma_Y \sigma_{Y'}.$$

wherein S, ranging from zero to one, is the numerical value defining structural similarity; Y is a vector defining the series $\{y_i\}$ for the matrix corresponding to the standard inorganic material; Y' is a vector defining the series $\{y_i'\}$ for the matrix corresponding to the respective candidate inorganic material, $\mu_Y$ is the mean of Y; $\mu_{Y'}$ is the mean of Y'; $\mu_Y$ is the standard deviation of Y; $\sigma_{Y'}$ is the standard deviation of Y'; and E is an operation to obtain the expectation value over all indices. Examples of results from this step are discussed more fully below.

Figure 3:
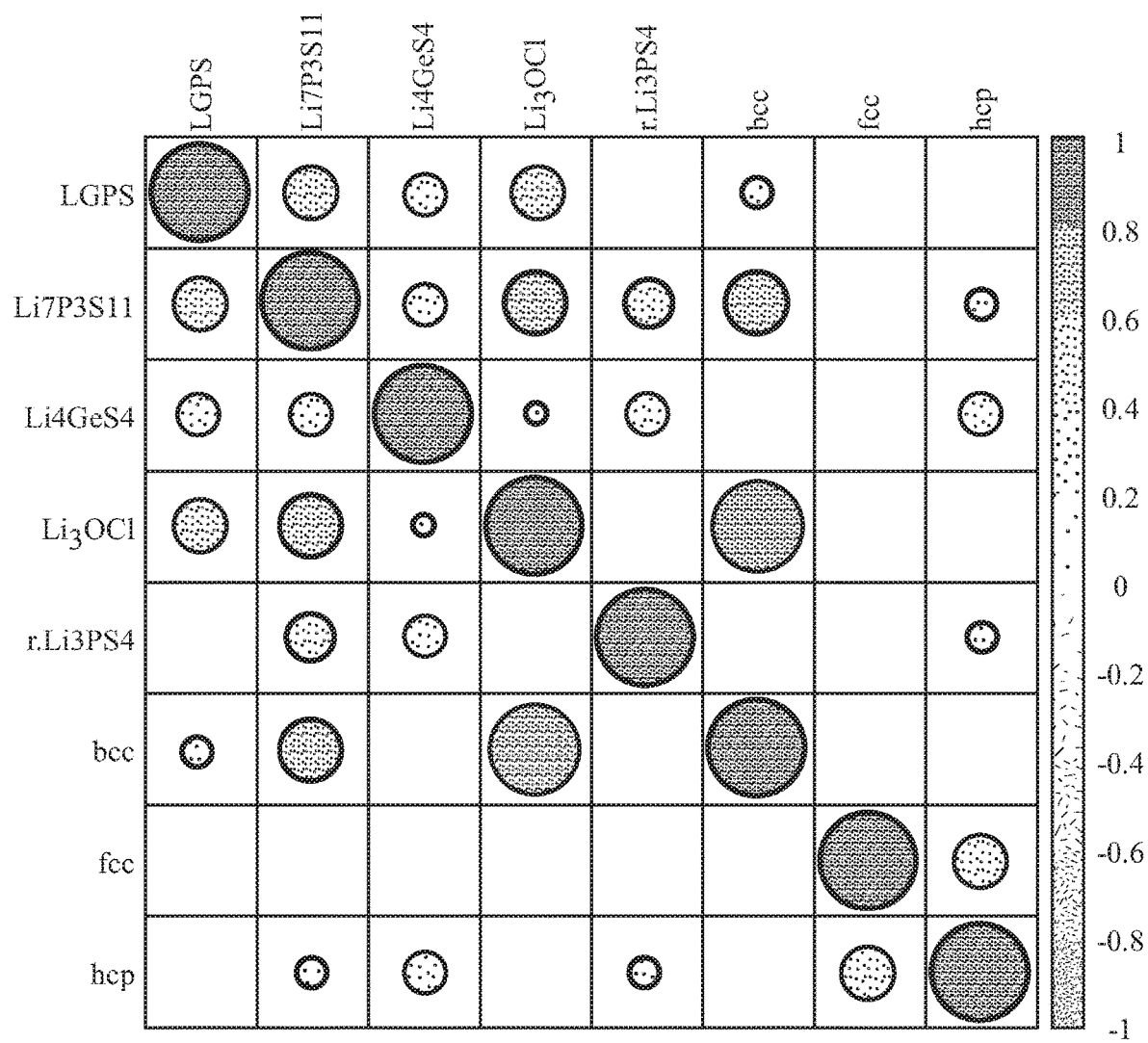
FIG. 3 is a quantitative similarity map of the inorganic materials of FIG. 2.

FIG. 3 shows a graphical plot of structural similarity values for the structures whose simulated X-ray diffraction patterns are shown in FIG. 2. The sizes of the circles in FIG. 3 correspond to the structural similarity values, such that a larger circle represents a larger structural similarity value. Thus, in the squares extending from the upper left corner to the lower right corner, each structure is compared to itself, resulting in the expected structural similarity value of 1, signifying identical structure.

It is clear from the results of FIG. 3 that Li$_3$OCl, Li$_7$P$_3$S$_{11}$ and LGPS are similar to bcc and γ-Li$_3$PS$_4$ and Li$_4$GeS$_4$ are more similar to hcp. Further however, these results show that the similarity to bcc follows as Li$_3$OCl>Li$_7$P$_3$S$_{11}$>LGPS. It can further be seen that Li$_3$OCl>Li$_7$P$_3$S$_{11}$ are highly structural similar to one another, and somewhat less similar to LGPS. Similarly, the results show that Li$_4$GeS$_4$ exhibits greater similarity to hcp than does γ-Li$_3$PS$_4$. The exact structural similarity values are shown graphically with reference to the sidebar at the right of FIG. 3. A quantitative structural similarity ranking and score of this type is previously unknown.

The method 100 can include a step 116 of selecting the candidate inorganic material having a desired value of S. For example, one might select the candidate inorganic material having the highest value of S, or one might select any candidate inorganic material having a value of S greater than a predetermined value.

In contrast to preceding approaches, an advantage of the method of the present disclosure is that it avoids a suggestion of similarity resulting from a determination that two structures can be equated through a large transformation. For example, in one previous study, two structures are compared by performing a continuous transformation to distort one structure into another. It is possible that a structure can be transformed into a second one through a large distortion, leading to a mistaken interpretation that these two structures are similar to each other. Specifically, it has been suggested that $Li_xIn_4SnS_8$ (where x=1 or 2) and $LiNaAs_2S_4$ can be distorted to match the bcc-structure through a large deviation of lattice parameters. This analysis then concluded that these two structures were not bcc-like.

Figure 4A:
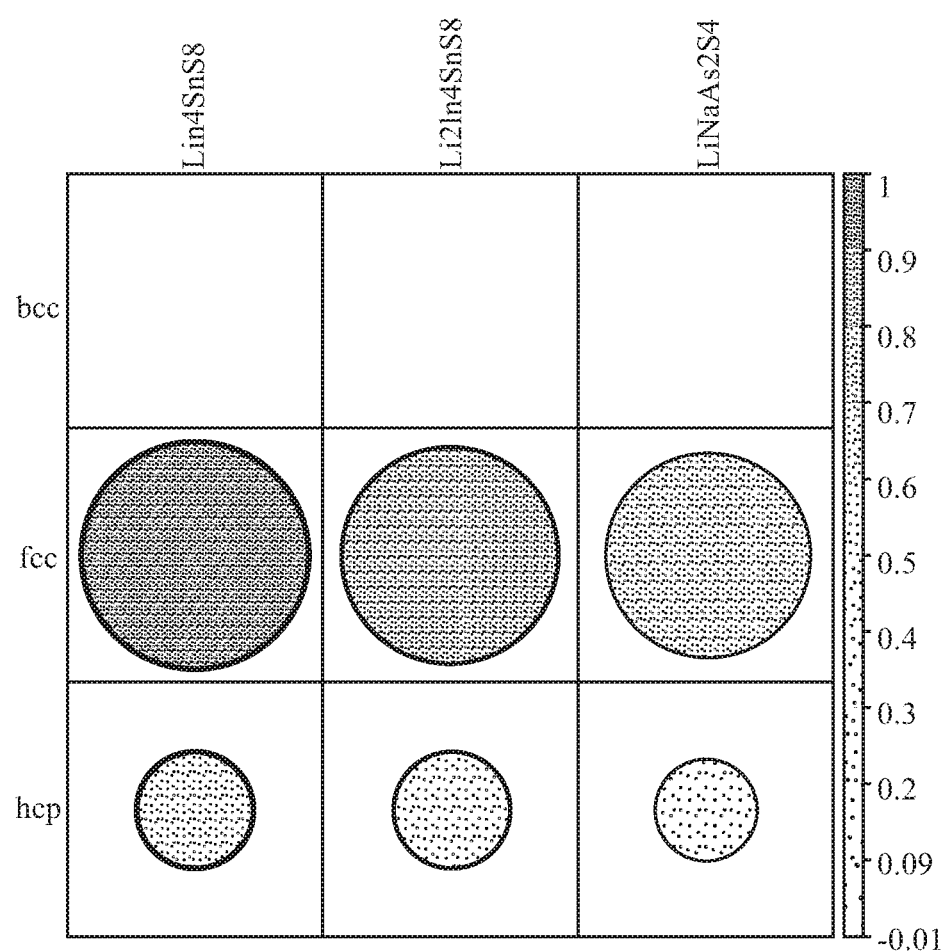
FIG. 4A is a quantitative similarity map of three different inorganic materials.
Figure 4C:
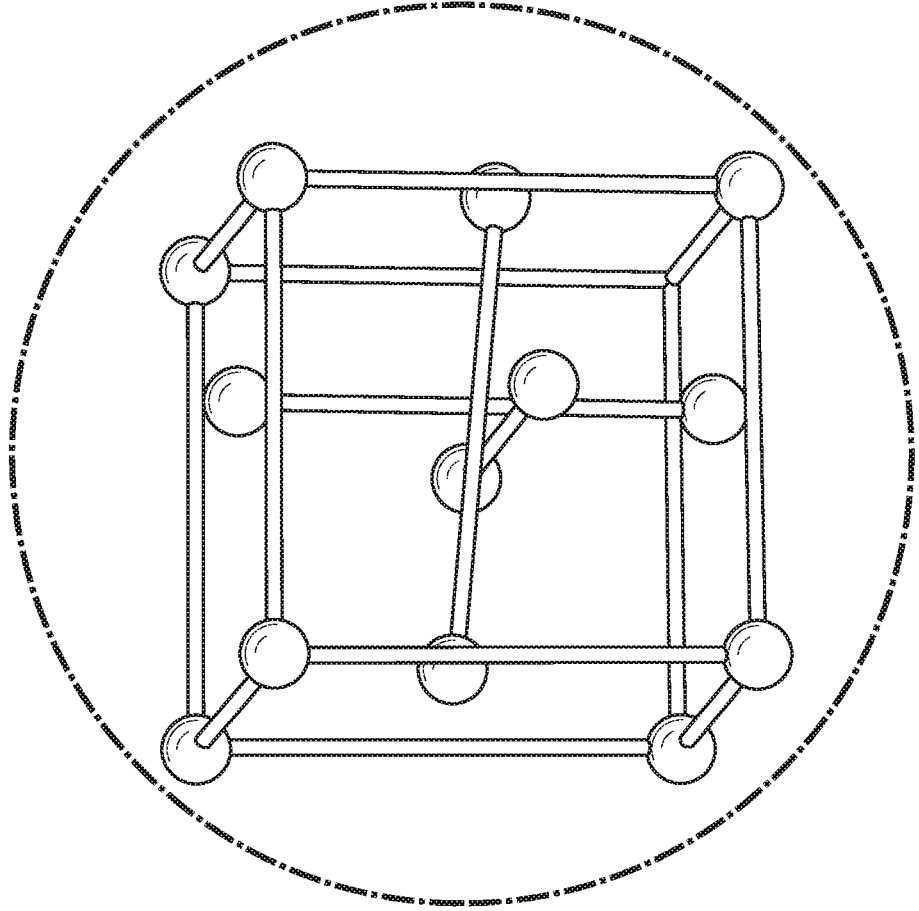
FIG. 4C is a unit cell from the anion-only lattice of FIG. 4B.
Figure 4B:
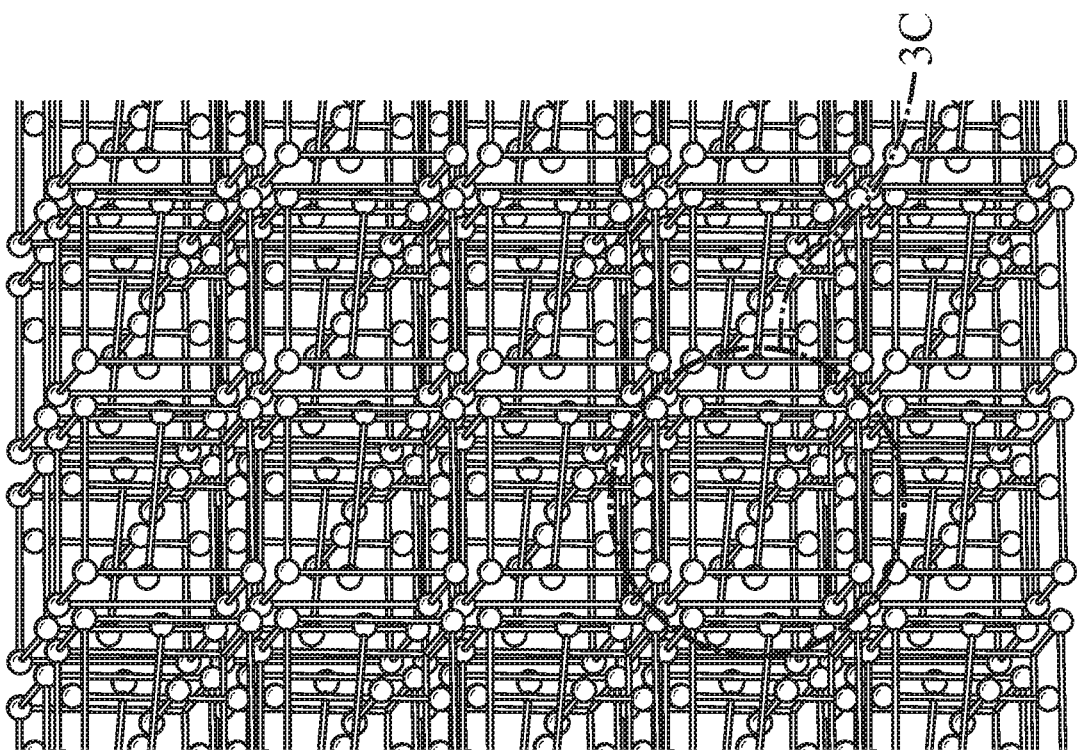
FIG. 4B is an anion-only lattice of the disclosed methods, derived from a $LiAsNa_2S_4$ crystal structure.

The quantitative method of the present disclosure dispels this misapprehension. FIG. 4A shows the results of $LiIn_4SnS_8$, $Li_2In_4SnS_8$, and $LiNaAs_2S_4$. As above, cation lattices were removed, all anions were replaced with sulfide, and unit cell volumes were scaled to a per-anion volume of 16 Å$^3$. The results shown in FIG. 4A reveal that they are substantially fcc-like, with minor hcp-like character. FIGS. 4B and 4C, showing a ball-and-stick representation of the anion-only lattice of $LiNaAs_2S_4$ clearly shows that it is indeed a slightly distorted fcc-type structure.

Considering why the present method yields a different structural analysis from that of prior distortion-based approaches, it is generally known that bcc-type structures can be transformed into fcc by isotropic compressing in the a-b plane, and simultaneous expansion in the c-direction with fixed volume. In particular, when the lattice parameter changes by 41.4%, bcc is completely transformed into fcc (e.g. using a Bain transformation). It is difficult to impossible to identify such large distortion using prior approaches that qualitatively measure structural similarity on the basis of structural distortion. In contrast, the method reported in the present disclosure gives a quantitative and more accurate way to represent and measure the similarity between crystal structures.

It will be noted that the method of the present disclosure has broad applications. First, it is the only method that directly transforms a discrete three-dimensional periodic lattice into a matrix type representation, as shown in FIGS. 2 and 3, thus enabling downstream analysis using statistical and machine learning methods. This cannot be achieved using prior methods, which only output the distortion that is necessary to match two structures. Second, the method of the present disclosure gives an accurate and quantitative measure of the similarity between different structures, and thus allows the discovery of physical patterns of different materials. Again, this is shown in FIG. 3, and particularly in FIGS. 4A-4C which shows a different result from that of prior distortion-based approaches.

Additionally, and as mentioned above, the method of the present disclosure can be applied to other materials fingerprints, such as band gaps, electronic structures, magnetic properties, to give a complete description of the material, thus paving the road toward materials informatics approach. In particular, as noted above, the present method can be employed to identify candidate materials that may have a desired property, based on their quantitative structural similarity to a material known to have the desired property.

To give an example of the application of the method of the present disclosure, the structure similarity between materials generally considered to be lithium ion conductors was considered. Structural similarity scores were determined for fifty-four distinct inorganic materials, according to the present method, as described above. Of the fifty-four, fourteen have been measured to have lithium ion conductivity greater than $10^{-5}$ S/cm, sixteen have been measured to have lithium ion conductivity within a range of $10^{-10}$-$10^{-5}$ S/cm, two have been measured to have lithium ion conductivity less than $10^{-10}$ S/cm, and twenty two have unknown lithium ion conductivity. Any or all of the first three groups can be considered standard inorganic materials, and the last group can be considered to include candidate inorganic materials.

Figure 5:
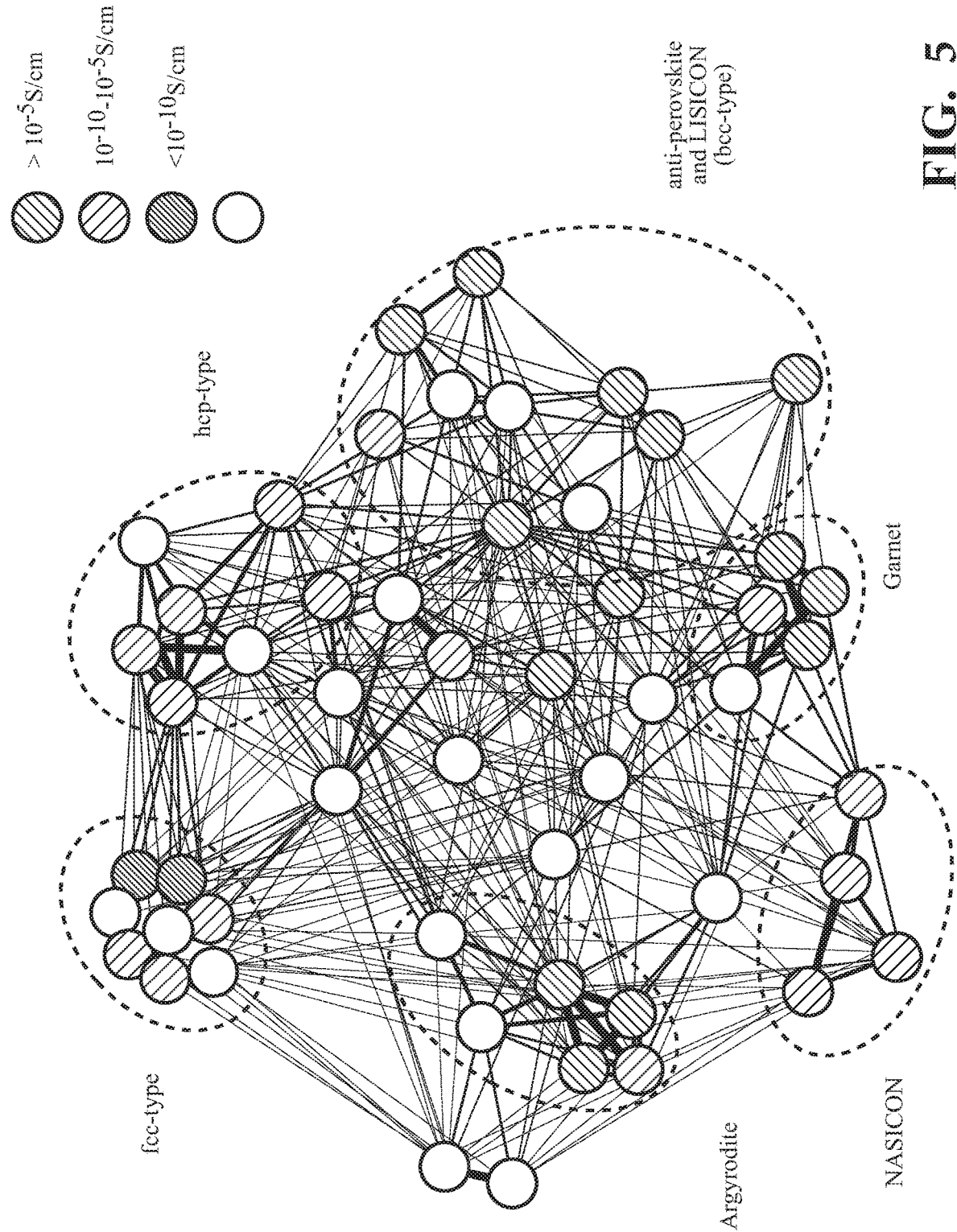
FIG. 5 is a cluster graph illustrating structural relatedness of multiple inorganic compounds examined according to the presently disclosed methods.

FIG. 5 is a graphical display of structural clusters derived from the similarity results for the fifty-four examined materials. The structural clusters were calculated using network visualizing software with a spring like force field. The results highlighted in FIG. 5 show several local clusters with distinct Li-conductivity. Besides the bcc-, hcp- and fcc-type clusters that have been suggested previously, the results shown in FIG. 5 identify several new clusters having high lithium ion conductivity. These include Argyrodite-type (e.g., $Li_{17}PS_5Cl$) and NASICON-type (e.g. $LiTi_2(PO_4)_3$) structures that are distinct from others in terms of both crystal structure and lithium ion conductivity. This information can be used to discover novel Lithium ion conductors, clearly demonstrating the utility of the method of the present disclosure. In particular, and with reference to the method step of selecting the candidate inorganic material having a desired value of S, while the structural similarity scores are not shown in FIG. 5, a candidate inorganic material to be selected in this step could be any of the several candidate materials shown in FIG. 5 to be structurally clustered with a group of known lithium ion conductors. For example, the Argyrodite-type cluster includes two candidate materials, $LiAlS_2$ and $LiGaS_2$, which one could select as having a desired value of S, for further investigation as potential lithium ion conductors.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A method for selecting an inorganic material having a desired property, the method comprising:
   selecting:
      a standard inorganic material known to have the desired property; and
      a plurality of candidate inorganic materials that may have the desired property;
   obtaining a set of atomic coordinates for the standard-inorganic material and each of the plurality of candidate inorganic materials, each set of atomic coordinates comprising:
      a cation lattice, comprising a cation identity and set of cation coordinates; and
      an anion lattice, comprising an anion identity and set of anion coordinates;
   removing the cation lattice from each set of atomic coordinates, to produce an anion-only lattice, each anion-only lattice defining an anionic unit cell, each anionic unit cell having volume per anion;
   replacing the anion identity in each of the anion-only lattices with an identity of a designated monoatomic anion, to ensure that all of the anion-only lattices have the same anion identity;
   re-scaling each anionic unit cell to a selected volume, to ensure that all anionic unit cells have the same volume per anion, to produce a modified anion-only lattices from each anion-only lattice;
   generating a simulated x-ray diffraction pattern for each modified anion-only lattice;
   generating, using the simulated x-ray diffraction pattern, a matrix for each anion-only lattice, each matrix comprising a series of diffraction angles, $\{x_i\}$, and a series of corresponding, simulated diffraction intensities, $\{y_i\}$, each series having indices, i, where $x_i$ is the same for all n×2 matrices at each index;
   generating, for each of the plurality of candidate inorganic materials, a numerical value, S, defining structural similarity between the standard inorganic material and the respective candidate inorganic material, by performing a calculation:

$$S=E[(Y-\mu_Y)(Y'-\mu_{Y'})]/\sigma_Y\sigma_{Y'}$$

wherein S, ranging from zero to one, is the numerical value defining structural similarity; Y is a vector defining the series $\{y_i\}$ for the matrix corresponding to the standard inorganic material; Y' is a vector defining the series $\{y_i'\}$ for the matrix corresponding to the respective candidate inorganic material, $\mu_Y$ is the mean of Y; $\mu_{Y'}$ is the mean of Y'; $\sigma_Y$ is the standard deviation of Y; $\sigma_{Y'}$ is the standard deviation of Y'; and
   E is an operation to obtain the expectation value over all indices; and
   selecting the candidate inorganic material having a desired value of S.

2. The method of claim 1, wherein rescaling the unit cell comprises an isotropic expansion/swelling of the lattice according to the formula:

$$a'/a_0=b'/b_0=c'/c_0=(N\times V_0/V)^{1/3}$$

wherein a', b', and c' are the lattice parameters after rescaling; $a_o$, $b_o$, $c_o$ are the lattice parameters before rescaling, N is the number of anions in the unit cell, V is the volume of the unit cell, and $V_o$ is the normalized volume of anions.

3. A method for performing a quantitative comparison of inorganic crystal structures, the method comprising:
   selecting at least two inorganic materials to be compared;
   obtaining a set of atomic coordinates for each of the at least two inorganic materials, each set of atomic coordinates comprising:
      a cation lattice, comprising a cation identity and set of cation coordinates; and
      an anion lattice, comprising an anion identity and set of anion coordinates;
   removing the cation lattice from each set of atomic coordinates, to produce an anion-only lattice, each anion-only lattice defining an anionic unit cell, each anionic unit cell having a volume per anion;
   replacing the anion identity in each of the anion-only lattices with an identity of a designated monoatomic anion, to ensure that all of the anion-only lattices have the same anion identity;
   re-scaling each anionic unit cell to a selected volume, to ensure that all anionic unit cells have the same volume per anion, to produce a modified anion-only lattices from each anion-only lattice;
   generating a simulated x-ray diffraction pattern for each modified anion-only lattice;
   generating, using the simulated x-ray diffraction pattern, a matrix for each anion-only lattice, each matrix comprising a series of diffraction angles, $\{x_i\}$, and a series of corresponding, simulated diffraction intensities, $\{y_i\}$, each series having indices, i, where $x_i$ is the same for all n×2 matrices at each index;
   generating, for each of the plurality of candidate inorganic materials, a numerical value, S, defining structural similarity between the standard inorganic material and the respective candidate inorganic material, by performing a calculation:

$$S=E[(Y-\mu_Y)(Y'-\mu_{Y'})]/\sigma_Y\sigma_{Y'}$$

wherein S, ranging from zero to one, is the numerical value defining structural similarity; Y is a vector defining the series $\{y_i\}$ for the matrix corresponding to the standard inorganic material; Y' is a vector defining the series $\{y_i'\}$ for the matrix corresponding to the respective candidate inorganic material, $\mu_Y$ is the mean of Y; $\mu_{Y'}$ is the mean of Y'; $\sigma_Y$ is the standard deviation of Y; $\sigma_{Y'}$ is the standard deviation of Y'; and E is an operation to obtain the expectation value over all indices.

4. The method according to claim 3, wherein rescaling the unit cell coordinates for each reciprocal crystal lattice structure comprises an isotropic expansion/swelling of the lattice according to a formula:

$$a'/a_0=b'/b_0=c'/c_0=(N\times V_0/V)^{1/3}$$

wherein a', b', and c' are the lattice parameters after rescaling; $a_o$, $b_o$, $c_o$ are the lattice parameters before rescaling, N is the number of anions in the unit cell, V is the volume of the unit cell, and $V_o$ is the normalized volume of anions.

5. A method for representing a crystal structure of an inorganic material in an n×2 matrix, the method comprising:
   obtaining a set of atomic coordinates for the inorganic material, the set of atomic coordinates comprising:
      a cation lattice, comprising a cation identity and set of cation coordinates; and an anion lattice, comprising an anion identity and set of anion coordinates;

removing the cation lattice from the set of atomic coordinates, to produce an anion-only lattice, the anion-only lattice defining an anionic unit cell, the anionic unit cell having a volume per anion;

generating a simulated x-ray diffraction pattern for the anion-only lattice;

generating the n×2 matrix, using the simulated x-ray diffraction pattern, the n×2 matrix comprising a series of diffraction angles, $\{x_i\}$, and a series of corresponding, simulated diffraction intensities, $\{y_i\}$.

6. The method as recited in claim 5, further comprising:
replacing the anion identity in the anion-only lattice with an identity of a designated monoatomic anion.

7. The method as recited in claim 6, further comprising:
re-scaling the anionic unit cell to a selected volume.

\* \* \* \* \*